(12) United States Patent
Ko et al.

(10) Patent No.: US 7,869,626 B2
(45) Date of Patent: Jan. 11, 2011

(54) IRIS RECOGNITION METHOD AND APPARATUS THEREOF

(75) Inventors: Jong Gook Ko, Daejeon (KR); Youn Hee Gil, Daejeon (KR); Jang Hee Yoo, Daejeon (KR); Kyo Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1010 days.

(21) Appl. No.: 11/702,863

(22) Filed: Feb. 6, 2007

(65) Prior Publication Data

US 2008/0069410 A1    Mar. 20, 2008

(30) Foreign Application Priority Data

Sep. 18, 2006    (KR) .................. 10-2006-0090310

(51) Int. Cl.
    *G06K 9/00*    (2006.01)
(52) U.S. Cl. ........................ 382/117; 382/324
(58) Field of Classification Search .................. 382/117
    See application file for complete search history.

(56) References Cited

U.S. PATENT DOCUMENTS

| | | | |
|---|---|---|---|
| 5,291,560 A | | 3/1994 | Daugman |
| 5,632,742 A | | 5/1997 | Frey et al. |
| 6,526,160 B1 | * | 2/2003 | Ito ............................ 382/117 |
| 2004/0184670 A1 | | 9/2004 | Jarman et al. |
| 2006/0147094 A1 | * | 7/2006 | Yoo ........................... 382/117 |

FOREIGN PATENT DOCUMENTS

| | | |
|---|---|---|
| JP | 2000-189403 | 7/2000 |
| JP | 2002056394 | 2/2002 |
| JP | 2003317102 | 11/2003 |
| JP | 2006-025968 | 2/2006 |
| KR | 1020010016242 B1 | 3/2001 |
| KR | 1020020023011 | 3/2002 |
| KR | 1020020065248 | 8/2002 |
| KR | 1020030061018 | 7/2003 |
| KR | 1020050025927 | 3/2005 |
| KR | 1020060096867 | 9/2006 |

OTHER PUBLICATIONS

Satomi, "Pupil circle and Irirs circle detection device", JP2003317102, Nov. 2003, Japenese-English machine translation.*

* cited by examiner

*Primary Examiner*—Samir A. Ahmed
*Assistant Examiner*—Ruiping Li
(74) *Attorney, Agent, or Firm*—Ladas & Parry LLP

(57) ABSTRACT

An iris recognition method is provided. In the iris recognition method, binary image data is obtained by receiving eye image data and filtering the received eye image data using a predetermined threshold value. Then, candidate center search regions are searched for finding a pupil center using profile information of rows and columns of the binarized image. a pupil boundary and a center point are detected by performing a mask operation using 8 pupil boundary mask templates for each of concentric circles formed of pointes in the searched candidate center search regions as candidate pupil centers and different radiuses. An iris boundary region is detected by performing a masking operation using 6 iris boundary mask templates corresponding to 6 locations for concentric circles formed of the pupil center as an origin and different radiuses.

19 Claims, 5 Drawing Sheets

FIG. 3

IRIS RECOGNITION METHOD AND APPARATUS THEREOF

CLAIM OF PRIORITY

This application claims the benefit of Korean Patent Application No. 2006-90310 filed on Sep. 18, 2006 in the Korean Intellectual Property Office, the disclosure of which is incorporated herein by reference.

BACKGROUND OF THE INVENTION

1. Field of the Invention

The present invention relates to an iris recognition method for effectively and accurately detecting iris from a captured eye image although the eye is covered by an eyebrow or an eyelid in the captured image, and an apparatus thereof.

2. Description of the Related Art

Among various biometric methods, iris recognition has been known as an excellent method for identifying a person in a view of uniqueness, invariability, and stability. The iris recognition has been applied to various fields requiring high level security because the false recognition rate of the iris recognition is very low.

Human's iris is fully grown up before three years old, and it does not change for life time unless he or she has specific trauma. Since the iris has more various patterns than a fingerprint patterns, it is known as the perfect personal identification method. Since the image of iris can be obtained in non-contact manner, it is very convenient personal identification method in a view of a user. Therefore, it is expected that the iris recognition will occupy a large portion of related market.

In general, it is essential to quickly recognize a pupil and iris from data of an image of persons in a personal identification method using iris recognition. An iris recognition system detects iris image data, specializes the detected iris image data, searches data identical to the specialized data in a database, identifies a person through comparing them, and determines whether it will accept or refuse a related request.

One of methods of obtaining specialized data from iris region was introduced in U.S. Pat. No. 5,291,560 by John G. Daugman. In this conventional method, an iris region is defined by setting one circle close to a boundary between an iris and a pupil, setting another circle close to a boundary between an iris and a papillary membrane, and defining an area between two set circles as the iris region. Then, the iris region is equally divided by a plurality of concentric circles, and annulus selection regions are defined. Then, iris feature data is extracted from each of the annulus selection regions through Gabor transform, and extracted iris feature data is stored as iris codes, thereby building a database. After building the database of the iris codes, iris feature data extracted from personal iris recognition is compared with each selection region of a registered iris feature data. It determines that a person requesting authentication is an identical person with a registered person if the difference is smaller than a predetermined threshold value.

Another conventional method was introduced in Korea Patent No. 10-0376415 that teaches a method of calculating a center point of an iris by obtaining both end points of boundaries in a horizontal direction and a vertical direction in a pupil area from a binary image, and calculating a middle point of obtained two end points as the center point of an iris.

In this method, it is difficult to recognize the iris if an eye is covered by an eyebrow or an eyelid. Therefore, there is demand for a method of effectively and accurately detecting iris from a captured eye image although the eye in the captured image is covered by an eyebrow or an eyelid in order to improve the iris recognition.

SUMMARY OF THE INVENTION

The present invention has been made to solve the foregoing problems of the prior art and therefore an aspect of the present invention is to provide a method for effectively and accurately recognizing an iris, and an apparatus thereof.

Another aspect of the invention is to provide a method for recognizing an iris from eye image data although an eye is covered by an eyebrow or an eyelid in a captured image.

According to an aspect of the invention, the invention provides an iris recognition method. In the iris recognition method, binary image data is obtained by receiving eye image data and filtering the received eye image data using a predetermined threshold value. Then, candidate center search regions are searched for finding a pupil center using profile information of rows and columns of the binarized image. a pupil boundary and a center point are detected by performing a mask operation using 8 pupil boundary mask templates for each of concentric circles formed of pointes in the searched candidate center search regions as candidate pupil centers and different radiuses. An iris boundary region is detected by performing a masking operation using 6 iris boundary mask templates corresponding to 6 locations for concentric circles formed of the pupil center as an origin and different radiuses.

According to another aspect of the invention for realizing the object, there is provided an iris recognition apparatus including an image input unit, a binarization unit, a pupil boundary search unit, and an iris boundary search unit. The image input unit receives eye image data obtained by photographing eyes using an external optical device. The binarization unit binarizes the input image data through filtering. The pupil boundary search unit including a template matching module for comparing pupil boundary mask templates corresponding to 8 locations of a pupil boundary region with the iris image data for detecting a pupil boundary and a center point using histogram information from the binarized images. The iris boundary search unit includes a template matching module for searching an iris boundary using iris boundary mask templates corresponding to six locations in a registered iris boundary region.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a diagram illustrating 8 pupil boundary mask templates according to an embodiment of the present invention;

DETAILED DESCRIPTION OF THE PREFERRED EMBODIMENT

Embodiments of the present invention will now be described in detail with reference to the accompanying drawings.

Figure 1:
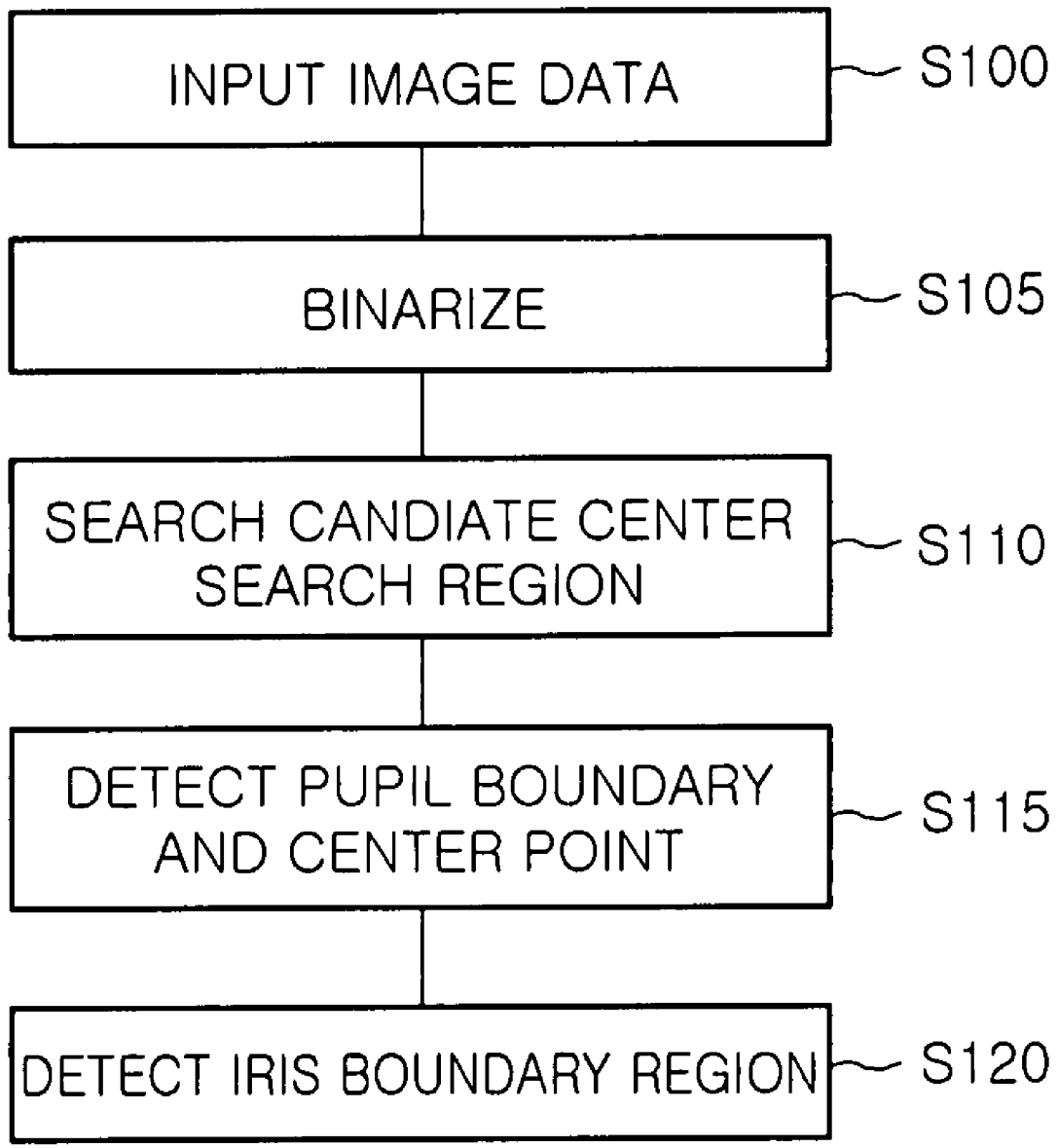
FIG. 1 is a flowchart illustrating an iris recognition method according to an exemplary embodiment of the present invention.

FIG. 1 is a flowchart illustrating an iris recognition method according to an exemplary embodiment of the present invention.

Referring to FIG. 1, eye image data is received at step S100. The received image data is filtered with a predetermined threshold value, thereby obtaining a binary image at step S105. That is, the eye image data, which is obtained by photographing eyes using an optical device such as a camera, is binarized through filtering to obtain a pupil boundary region. The binarization is performed to easily detect the pupil boundary region from the image data inputted at the step S100.

The filtering operation is performed to binarize the received image data. In the filtering operation, the distribution of pixel values in an image is analyzed, a pixel having a value lower than a threshold value, that is, a dark color pixel, is transformed to 1, and a pixel having a value higher than the threshold value, that is, a bright color pixel is transformed to 0. Through the filtering operation, the pixels in a pupil region only have 1. Preferably, the threshold can be set to gray 40 to 60. Therefore, pixels having a value smaller than threshold are set to 1, and pixels having a value larger than threshold are set to 0. Since the threshold is different according to a captured image, the threshold can be differently set by a user.

Then, candidate center search regions for finding a pupil center are searched at step S110 using profile information of rows and columns of the binarized image at step S110. The candidate center search region for the pupil center is searched for effectively performing a pupil search for iris recognition, and the candidate center search region is a region of pixels having values higher than the threshold value among regions with dark pixels in the binarized image.

Then, a pupil boundary and a center point thereof are detected by performing a masking operation using 8 pupil boundary mask templates for circles formed of different radius values and points in the searched candidate center search regions as candidate pupil points at step S115. In more detail, points in the searched candidate center search regions obtained through the step S105 are set to candidate pupil center points. Then, the masking operation is performed on concentric circles that are formed of the candidate pupil center point as an origin while changing a radius value thereof. Herein, it is preferable to use predetermined 8 pupil boundary mask templates. The pupil boundary mask templates will be described later.

Then, an iris boundary region is detected by performing a masking operation on concentric circles formed of the detected pupil center point from the step S115 as an origin and different radius values at step S120. It is preferable to use 6 iris boundary mask templates which are predetermined corresponding to 6 locations of an iris boundary region. The iris boundary mask template will be described in later.

Figure 2:
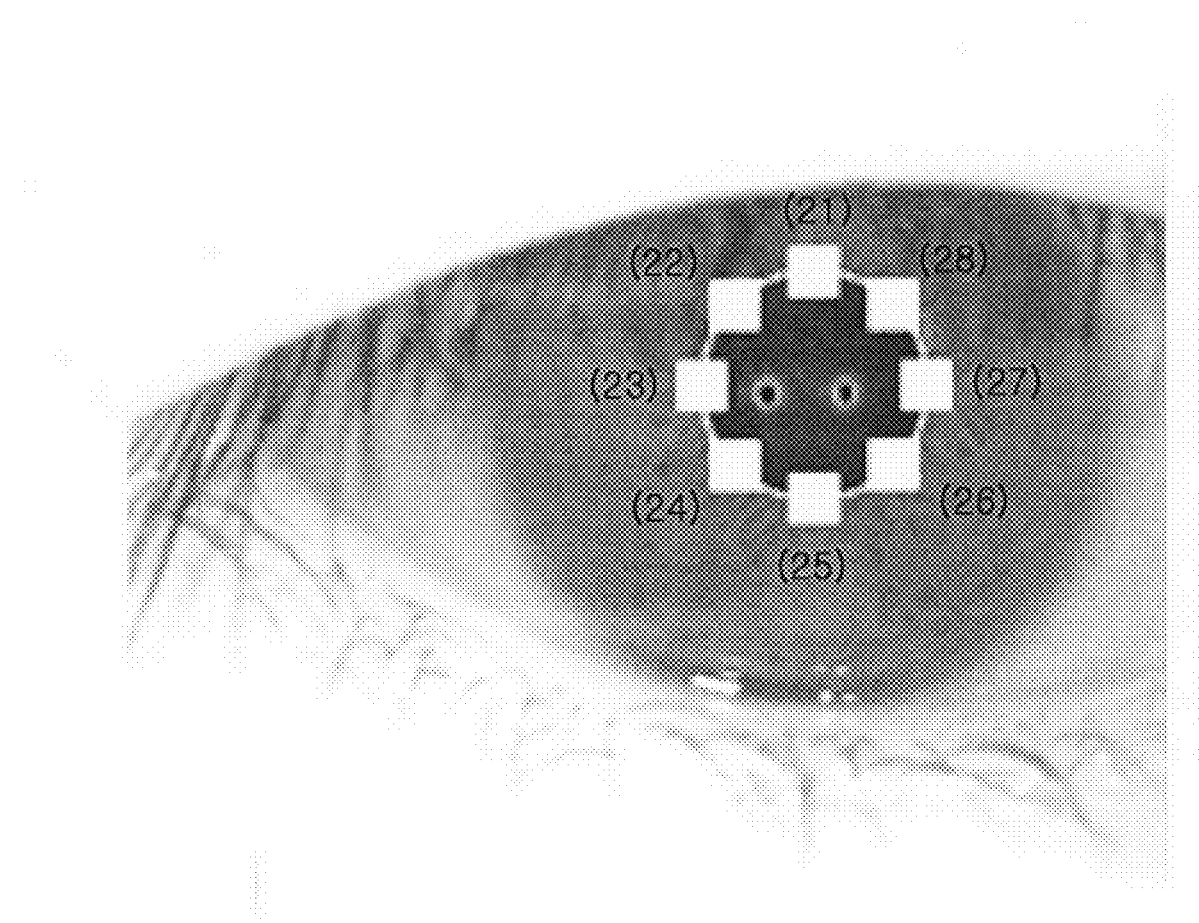
FIG. 2 is a schematic diagram for describing a step of detecting a pupil boundary and a center point from searched candidate center search regions in an iris recognition method according to an embodiment of the present invention.
Figure 3:
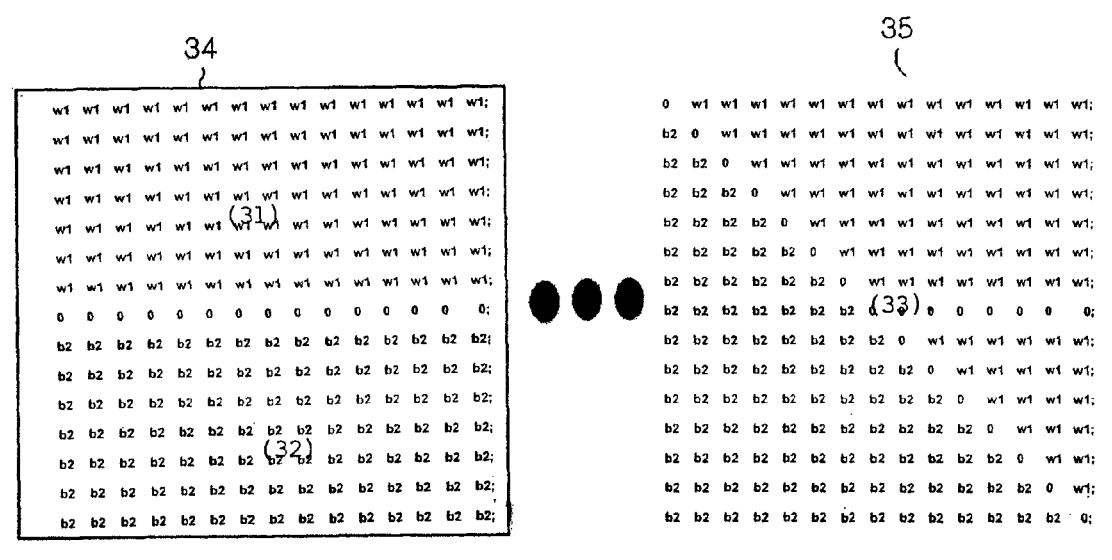

FIG. 2 and FIG. 3 are schematic diagrams for describing a step of detecting a pupil boundary and a center point from searched candidate center search regions in an iris recognition method according to an embodiment of the present invention.

Referring to FIG. 2, at the step of detecting the pupil boundary and the center point, points in the searched candidate center search regions are assigned as candidate pupil center points, and a masking operation is performed using 8 pupil boundary mask templates for each of the concentric circles formed of the candidate pupil center points as an origin and different radius values.

Herein, the masking operation is perform to determine whether the 8 pupil boundary mask templates 21 to 28 corresponding to 8 predetermined locations in the pupil boundary region are matched with the concentric circles formed of the candidate pupil center points or not.

In the present embodiment, the 8 pupil boundary mask templates 21 to 28 can be set to be corresponding to the locations separated from a circle at about 45°.

Preferably, a pupil boundary region is detected using a following Equation 1.

$$\underset{(r,(x,y))}{\text{Max}} \left[ \sum_{i=1}^{8} \text{pupil\_boundary\_mask}(i) \times \text{img\_area}(i) \right] \quad \text{Equation 1}$$

In Equation 1, a first part pupil_boundary_mask(i) denotes 8 pupil boundary masks 21 to 28, and a second part image_area(i) denotes search regions in an iris image, which are object to mask. That is, the first part and the second part are multiplied for each of circles searched by a radius r and a center point (x, y), and the multiplying results of circles are added. Then, a circle having the largest value is selected from them, and the radius r and the center coordinate (x, y) are set to a radius and a center point of a pupil.

FIG. 3 is a diagram illustrating 8 pupil boundary mask templates according to an embodiment of the present invention.

Referring to FIG. 3, each mask template is formed of 15×15. Herein, w1(31), which is a bright color pixel, has a positive coefficient value, and b2 (32), which is a dark color pixel, has a negative coefficient value. Herein, a mask template 34 in FIG. 3 is corresponding to the pupil boundary mask template 21 in FIG. 2, and a mask template 35 of FIG. 3 is corresponding to the pupil boundary mask template 28 in FIG. 2.

In order to reduce the influence of eyebrow and eyelid when detecting a pupil boundary, it is preferable to compose the pupil boundary mask template that the upper most pupil boundary mask template 21 and the lower most pupil boundary mask template 25 have a smaller w1 than other pupil boundary mask templates.

Figure 4:
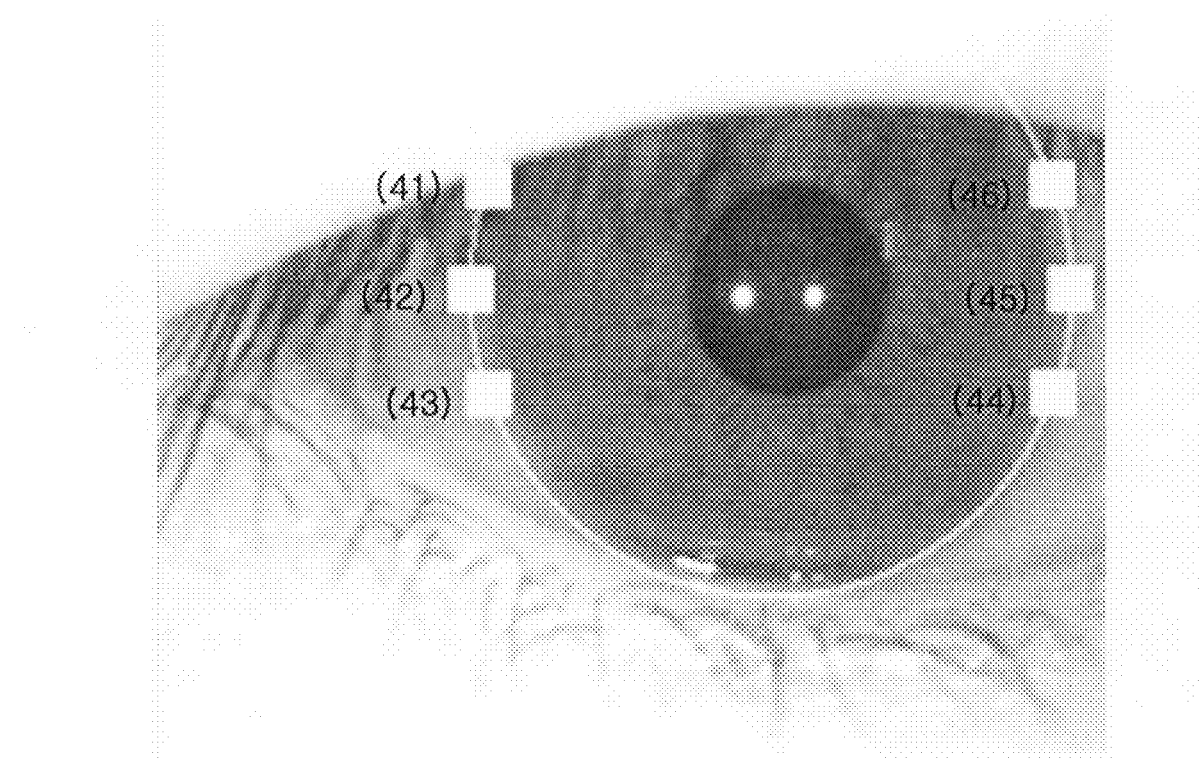
FIG. 4 is a schematic diagram illustrating a step of detecting an iris boundary region for iris recognition according to an embodiment of the present invention.

FIG. 4 is a schematic diagram illustrating a step of detecting an iris boundary region for iris recognition according to an embodiment of the present invention.

Referring to FIG. 4, an iris boundary region is detected by performing a masking operation using 6 mask templates predetermined corresponding to 6 locations in an iris boundary region for concentric circles formed of the detected pupil center point as an origin and different radiuses.

Preferably, the iris boundary is detected using a following Equation 2.

$$\underset{(r,(x,y))}{\text{Max}} \left[ \sum_{i=1}^{8} \text{iris\_boundary\_mask}(i) \times \text{img\_area}(i) \right] \quad \text{Equation 2}$$

In Equation 2, a first part iris_boundary_mask(i) denotes 6 iris boundary masks 41 to 46, and a second part image_area(i) denotes search regions in an iris image, which are object to mask. That is, the first part and the second part are multiplied for each of circles searched by a radius r and a center point (x, y), and the multiplying results of circles are added. Then, a circle having the largest value is selected from them, and the radius r is selected as a boundary of an iris.

The six iris boundary mask templates 41 to 46 can perform a masking operation using iris boundary mask templates 42 and 45, which are placed at two contact points of an extension of a horizontal line passing a pupil center point and a circle having the pupil center point as a center, and iris boundary mask templates 41, 43, 44 and 46 formed of boundary points of circles separated from the contact points 42 and 45 at about 22.5° upwardly and downwardly. The reason of composing the iris boundary mask templates 41 to 46 as described above is for accurately and effectively detecting an iris although the iris region is covered by eyebrows or eyelids.

The six iris boundary mask templates 41 to 46 according to the present embodiment can be formed of a 15×15 formation as like the pupil boundary mask templates 21 shown in FIG. 2.

Figure 5:
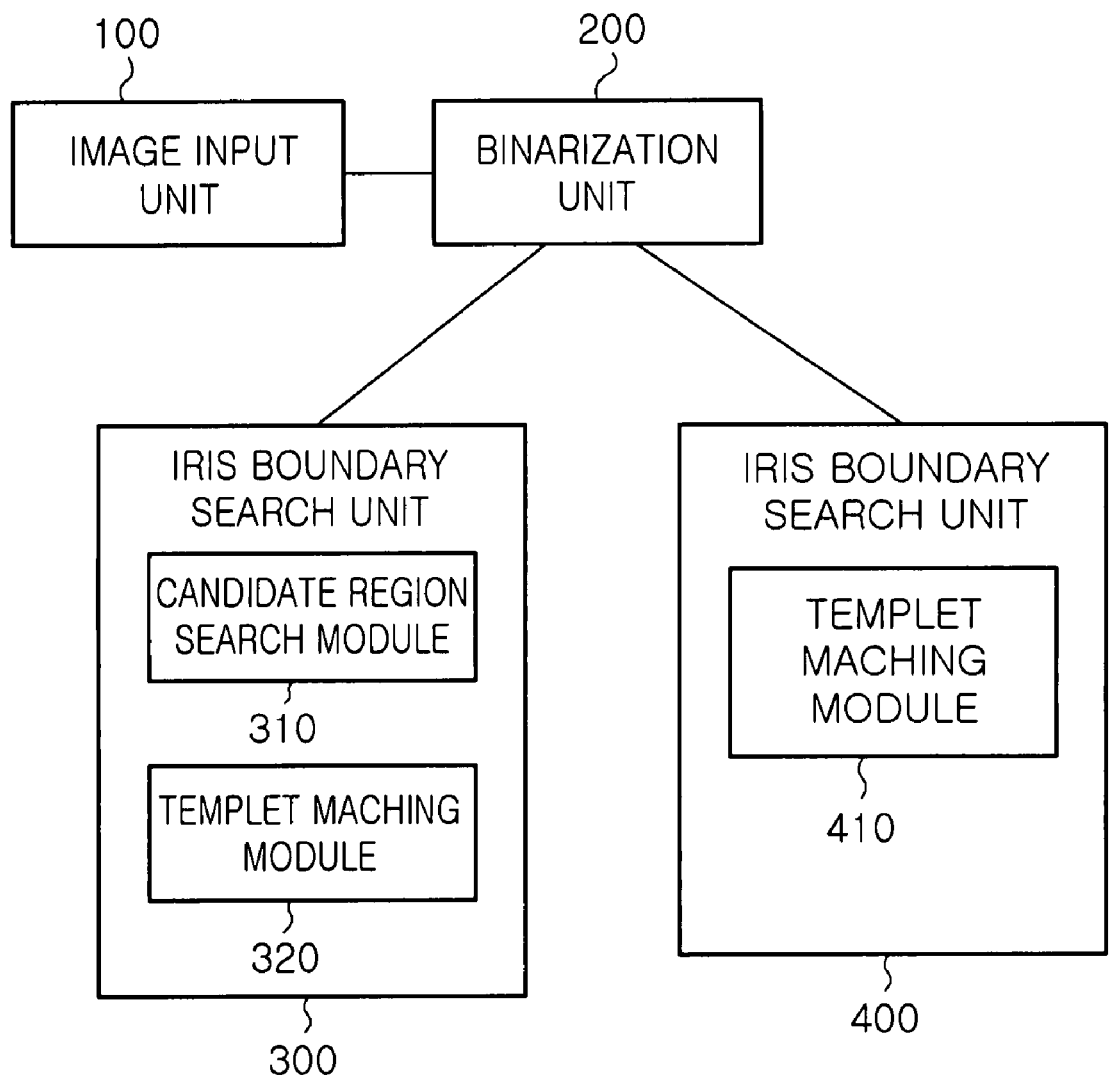
FIG. 5 is a block diagram illustrating an iris recognition apparatus according to an embodiment of the present invention.

FIG. 5 is a block diagram illustrating an iris recognition apparatus according to an embodiment of the present invention.

Referring to FIG. 5, the iris recognition apparatus according to the present invention includes an image input unit 100, a binarization unit 200, a pupil boundary search unit 300, and an iris boundary search unit 400.

The image input unit 100 receives image data obtained by photographing an eye using an external optical device such as an iris photographing device. In the present embodiment, it is preferable that the image input unit includes a function for extracting an eye region from the eye image data.

The binarization unit 200 binarizes the input image data from the image input unit 100 with a predetermined threshold through a low band filter. The binarization unit 200 analyzes the pixel values in the received image data, and transforms the pixel values smaller than the threshold, dark color pixels, to 1 and the pixel values larger than the threshold, bright color pixels, to 0.

The pupil boundary search unit 300 includes a candidate reason search module 310 for searching candidate center search regions for finding a pupil center using profile information of rows and columns of the binarized images, and a template matching module 320 for detecting a pupil boundary and a center point by performing a masking operation using 8 pupil boundary mask templates for finding a pupil boundary for circles formed of points in the searched candidate center search region as candidate pupil center points and different radiuses.

The iris boundary search unit 400 includes a template matching module 410 for searching an iris boundary using mask templates corresponding to six locations in a pre-registered iris boundary region based on the pupil boundary and the center point data of the pupil boundary search unit 300.

As set forth above, according to the embodiments of the present invention, iris can be effectively and accurately recognized compared to the conventional iris recognition although the eye is covered by an eyebrow or an eyelid in the captured picture.

While the present invention has been shown and described in connection with the preferred embodiments, it will be apparent to those skilled in the art that modifications and variations can be made without departing from the spirit and scope of the invention as defined by the appended claims.

What is claimed is:

1. An iris recognition method comprising:

obtaining binary image data by receiving eye image data and filtering the received eye image data using a predetermined threshold value;

searching candidate center search regions for finding a pupil center using profile information of rows and columns of the binarized image;

detecting a pupil boundary and a center point by performing a mask operation using 8 pupil boundary mask templates for each of concentric circles formed of points in the searched candidate center search regions as candidate pupil centers and different radiuses, wherein each pupil boundary mask template is formed of a 15×15 formation; and detecting an iris boundary region by performing a masking operation using 6 iris boundary mask templates corresponding to 6 locations for concentric circles formed of the pupil center as an origin and different radiuses.

2. The method according to claim 1, wherein in the step of obtaining the binarized image, pixel value distribution in the eye image data are analyzed, pixels having values smaller than a threshold value are transformed to 1, and pixels having values larger than a threshold value are transformed to 0, thereby binarizing the eye image data.

3. The method according to claim 1, wherein the step of detecting the pupil boundary and the center point includes multiplying the eight pupil boundary masks and the search areas in an iris image for circles that are searched by a radius r and a center point (x, y), adding the multiplying results, and setting a radius and an origin of a pupil as a radius r and a center coordinate (x, y) of a circle having the largest value using Equation:

$$\underset{(r,(x,y))}{\text{Max}}\left[\sum_{i=1}^{8} \text{pupil\_boundary\_mask}(i) \times \text{img\_area}(i)\right],$$

wherein pupil_boundary_mask(i) denotes the eight pupil boundary masks, and image_area(i) denotes search regions.

4. The method according to any one of claims 1 and 3, wherein the eight pupil boundary mask templates are separated from a circle at 45°.

5. The method according to claim 1, wherein the threshold value is set between gray level 40 and gray level 60.

6. The method according to claim 5, wherein in the pupil boundary mask template, bright color pixels have positive coefficient values, and dark color pixels have negative coefficient values.

7. The method according to claim 1, wherein the values of bright color pixels of the upper most pupil boundary mask template and the lower pupil boundary mask template are smaller than those of other pupil boundary mask templates.

8. The method according to claim 1, wherein the six iris boundary mask templates are two contact points of extension of a horizontal line passing a pupil center point and a circle having the pupil center point as a center, and boundary points of circles separated from the contact points at about 22.5° upwardly and downwardly.

9. The method according to claim 1, wherein the iris boundary mask template is formed of a 15×15 formation.

10. The method according to claim 9, wherein in the iris boundary mask template, bright color pixel values have positive coefficient values and dark color pixel values have negative coefficient values.

11. The method according to claim 1, wherein the iris boundary is detected by multiplying the six iris boundary masks and the search areas in binary image that is an object of each masking operation for circles searched by a radius r and a center point (x, y), adding the multiplying results, and deciding a radius r of a circle having the largest value as an iris boundary using Equation:

$$\underset{(r,(x,y))}{\mathrm{Max}}\left[\sum_{i=1}^{6}\mathrm{iris\_boundary\_mask}(i)\times\mathrm{img\_area}(i)\right],$$

wherein iris_boundary_mask(i) denotes the six iris boundary masks, and image_area(i) denotes the search regions.

12. An iris recognition apparatus comprising:
an image input unit for receiving eye image data obtained by photographing eyes using an external optical device;
a binarization unit for binarizing the input image data through filtering;
a pupil boundary search unit including a template matching module for comparing pupil boundary mask templates corresponding to 8 locations of a pupil boundary region with the iris image data for detecting a pupil boundary and a center point using histogram information from the binarized images wherein each pupil boundary mask template is formed of a 15×15 formation; and
an iris boundary search unit including a template matching module for searching an iris boundary using iris boundary mask templates corresponding to six locations in a registered iris boundary region.

13. The iris recognition apparatus according to claim 12, the binarization unit analyzes pixel distribution values in the eye image data, transforms pixels having values smaller than a threshold value to 1, and pixels having values larger than a threshold value to 0.

14. The iris recognition apparatus according to claim 12, wherein the pupil boundary and the center point are detected by multiplying the eight pupil boundary masks and the search areas in an iris image for circles that are searched by a radius r and a center point (x, y), adding the multiplying results, and setting a radius and an origin of a pupil as a radius r and a center coordinate (x, y) of a circle having the largest value using Equation:

$$\underset{(r,(x,y))}{\mathrm{Max}}\left[\sum_{i=1}^{8}\mathrm{pupil\_boundary\_mask}(i)\times\mathrm{img\_area}(i)\right],$$

wherein pupil_boundary_mask(i) denotes the eight pupil boundary masks, and image_area(i) denotes search regions.

15. The iris recognition apparatus according to claim 12, wherein each iris boundary mask template is formed of a 15×15 formation.

16. The iris recognition apparatus according to claim 15, wherein the iris boundary is detected by multiplying the six iris boundary masks and the search areas in binary image that is an object of each masking operation for circles searched by a radius r and a center point (x, y), adding the multiplying results, and deciding a radius r of a circle having the largest value as an iris boundary using Equation:

$$\underset{(r,(x,y))}{\mathrm{Max}}\left[\sum_{i=1}^{6}\mathrm{iris\_boundary\_mask}(i)\times\mathrm{img\_area}(i)\right],$$

wherein iris_boundary_mask(i) denotes the six iris boundary masks, and image_area(i) denotes the search regions.

17. An iris recognition method comprising:
obtaining binary image data by receiving eye image data and filtering the received eye image data using a predetermined threshold value;
searching candidate center search regions for finding a pupil center using profile information of rows and columns of the binarized image;
detecting a pupil boundary and a center point by performing a mask operation using 8 pupil boundary mask templates for each of concentric circles formed of points in the searched candidate center search regions as candidate pupil centers and different radiuses; and
detecting an iris boundary region by performing a masking operation using 6 iris boundary mask templates corresponding to 6 locations for concentric circles formed of the pupil center as an origin and different radiuses, wherein the iris boundary mask template is formed of a 15×15 formation.

18. The method according to claim 17, wherein each pupil boundary mask template is formed of a 15×15 formation.

19. The method according to claim 18, wherein the step of detecting the pupil boundary and the center point includes multiplying the eight pupil boundary masks and the search areas in an iris image for circles that are searched by a radius r and a center point (x, y), adding the multiplying results, and setting a radius and an origin of a pupil as a radius r and a center coordinate (x, y) of a circle having the largest value using Equation:

$$\underset{(r,(x,y))}{\mathrm{Max}}\left[\sum_{i=1}^{8}\mathrm{pupil\_boundary\_mask}(i)\times\mathrm{img\_area}(i)\right],$$

wherein pupil_boundary_mask(i) denotes the eight pupil boundary masks, and image_area(i) denotes search regions; and
wherein the iris boundary is detected by multiplying the six iris boundary masks and the search areas in binary image that is an object of each masking operation for circles searched by a radius r and a center point (x, y), adding the multiplying results, and deciding a radius r of a circle having the largest value as an iris boundary using Equation:

$$\underset{(r,(x,y))}{\mathrm{Max}}\left[\sum_{i=1}^{6}\mathrm{iris\_boundary\_mask}(i)\times\mathrm{img\_area}(i)\right],$$

wherein iris_boundary_mask(i) denotes the six iris boundary masks, and image_area(i) denotes the search regions.

* * * * *